(12) United States Patent
Zhang et al.

(10) Patent No.: US 11,153,651 B2
(45) Date of Patent: Oct. 19, 2021

(54) METHOD, APPARATUS, AND DEVICE FOR OBTAINING PLAY DATA, AND STORAGE MEDIUM

(71) Applicants: BAIDU ONLINE NETWORK TECHNOLOGY (BEIJING) CO., LTD., Beijing (CN); SHANGHAI XIAODU TECHNOLOGY CO. LTD, Shanghai (CN)

(72) Inventors: Zhike Zhang, Beijing (CN); Fei Wang, Beijing (CN); Jiaguang Lu, Beijing (CN); Zhouwei Zhai, Beijing (CN); Wenlin Dong, Beijing (CN); Hongwei Ma, Beijing (CN); Zhaoji Xu, Beijing (CN); Sheng Chen, Beijing (CN); Weiwen Gao, Beijing (CN); Ning Li, Beijing (CN)

(73) Assignees: BAIDU ONLINE NETWORK TECHNOLOGY (BEIJING) CO., LTD.; SHANGHAI XIAODU TECHNOLOGY CO. LTD.

(*) Notice: Subject to any disclaimer, the term of this patent is extended or adjusted under 35 U.S.C. 154(b) by 0 days.

(21) Appl. No.: 16/454,176

(22) Filed: Jun. 27, 2019

(65) Prior Publication Data
US 2019/0320230 A1    Oct. 17, 2019

(30) Foreign Application Priority Data
Jul. 4, 2018    (CN) .......................... 201810725194.X (51) Int. Cl.
*H04N 21/462*    (2011.01)
*H04N 21/239*    (2011.01)
(Continued)

(52) U.S. Cl.
CPC ..... *H04N 21/4622* (2013.01); *H04N 21/2393* (2013.01); *H04N 21/437* (2013.01);
(Continued)

(58) Field of Classification Search
CPC ......... H04N 21/47202; H04N 21/2393; H04N 21/4312; H04N 21/437; H04N 21/4622;
(Continued)

(56) References Cited

U.S. PATENT DOCUMENTS

| 2002/0091762 A1 | 7/2002 | Sohn et al. |
| 2009/0037954 A1* | 2/2009 | Nagano ................. H04H 60/72 725/39 |

(Continued)

FOREIGN PATENT DOCUMENTS

| CN | 101489112 A | 7/2009 |
| CN | 103929683 A | 7/2014 |

(Continued)

OTHER PUBLICATIONS

First Office Action issued in Chinese Patent Application No. 201810725194.X dated Apr. 3, 2020.
(Continued)

*Primary Examiner* — Omar S Parra
(74) *Attorney, Agent, or Firm* — Dilworth IP, LLC (57) ABSTRACT

The present disclosure provides a methods, an apparatus and a device for obtaining play data, and a storage medium, including: receiving request information sent by a user, and transmitting the request information to a server, so that the server searches VOD data and EPG data simultaneously according to the request information, where the EPG data includes live broadcast data and live broadcast playback data; receiving the VOD data and the EPG data sent by the server; displaying the VOD data and the EPG data simultaneously, when the VOD data and the EPG data are
(Continued)

determined to have been received. Therefore, the VOD data and the EPG data may be searched simultaneously, and the terminal device may simultaneously obtain the VOD data and the EPG data, allowing the user to obtain the VOD data and the EPG data simultaneously, so as to facilitate the user to watch the data in time.

20 Claims, 4 Drawing Sheets

(51) Int. Cl.
    *H04N 21/431*     (2011.01)
    *H04N 21/437*     (2011.01)
    *H04N 21/472*     (2011.01)
    *H04N 21/482*     (2011.01)

(52) U.S. Cl.
    CPC ... *H04N 21/4312* (2013.01); *H04N 21/47202* (2013.01); *H04N 21/4821* (2013.01)

(58) Field of Classification Search
    CPC ............. H04N 21/4821; H04N 21/232; H04N 21/235; H04N 21/482; H04N 21/4828
    See application file for complete search history.

(56) References Cited

U.S. PATENT DOCUMENTS

| | | | |
|---|---|---|---|
| 2009/0254946 A1 | 10/2009 | Vogel | |
| 2010/0293579 A1* | 11/2010 | Kulick | H04N 21/2665 725/49 |
| 2011/0154404 A1 | 6/2011 | Piepenbrink et al. | |
| 2011/0158610 A1* | 6/2011 | Paul | H04N 5/76 386/297 |
| 2011/0313775 A1* | 12/2011 | Laligand | H04N 21/234336 704/275 |
| 2013/0198005 A1 | 8/2013 | Xiong et al. | |
| 2019/0349619 A1* | 11/2019 | Hou | H04N 21/251 |

FOREIGN PATENT DOCUMENTS

| | | | |
|---|---|---|---|
| CN | 104270679 | A | 1/2015 |
| CN | 105323625 | A | 2/2016 |
| CN | 105592320 | A | 5/2016 |
| CN | 107613328 | A | 1/2018 |
| JP | 2007226649 | A | 9/2007 |
| JP | 2007280288 | A | 10/2007 |
| JP | 2009055095 | A | 3/2009 |
| JP | 2013141133 | A | 7/2013 |
| JP | 2013222354 | A | 10/2013 |
| JP | 2014132710 | A | 7/2014 |
| JP | 2017191417 | A | 10/2017 |

OTHER PUBLICATIONS

Second Office Action issue in CN Patent Application No. 201810725194.X dated Jun. 19, 2020.
Yamaguchi, T. et al., Program Navigation System Based on Metadata for Broadcasting-Communications Media Linkage Service, IEICE Technical Report, vol. 105, 2006, pp. 2-10.
First Office Action in JP Patent Application No. 2019124265 dated Sep. 24, 2020.
Second Office Action in JP Patent Application No. 2019124265 dated Feb. 24, 2021.
Third Office Action in JP Patent Application No. 2019124265 dated Jul. 26, 2021.

* cited by examiner

METHOD, APPARATUS, AND DEVICE FOR OBTAINING PLAY DATA, AND STORAGE MEDIUM

CROSS-REFERENCE TO RELATED APPLICATIONS

This application claims priority to Chinese Patent Application No. 201810725194.X, filed on Jul. 4, 2018, which is hereby incorporated by reference in its entirety.

FIELD OF THE TECHNOLOGY

Embodiments of the present disclosure relates to the technical field of Artificial Intelligence (AI) and, in particular, to a method, an apparatus, and a device for obtaining play data, and a storage medium.

BACKGROUND

With the development of communication and intelligent terminal technologies, a user, besides using an intelligent terminal such as a mobile phone, a tablet computer, and a computer to make calls or query information, may also control an intelligent terminal device, for example, control an terminal device such as an intelligent loudspeaker, an intelligent TV and the like to play audio or video.

At present, when controlling the intelligent terminal device to play data such as audio or video, the user may control the intelligent terminal device for video on demand (VOD), and then the intelligent terminal device obtains VOD data for playing, or the user may control the intelligent terminal device to obtain live broadcast data, and then the intelligent terminal device obtains the live broadcast data for playing.

However, in the prior art, it is merely able to obtain either the VOD data or the live broadcast data. When obtaining the VOD data, it is not able to obtain VOD resources for some of the VOD data, or when obtaining the live broadcast data, it is not able to obtain live broadcast resources for some of the live broadcast data, so that the intelligent terminal device cannot obtain the resources in time, causing that the user cannot watch the data in time.

SUMMARY

Embodiments of the present disclosure provide a method, an apparatus and a device for obtaining play data, and a storage medium, which are used to solve the problem that the intelligent terminal device in the above solutions cannot obtain resources in time, causing the user cannot watch the data in time.

A first aspect of the present disclosure provides a method for obtaining play data, including:

receiving request information sent by a user, and transmitting the request information to a server, so that the server searches VOD data and electronic program guide (EPG) data simultaneously according to the request information, where the EPG data includes live broadcast data and live broadcast playback data;

receiving the VOD data and the EPG data sent by the server; and displaying the VOD data and the EPG data simultaneously, when the VOD data and the EPG data are determined to have been received.

Optionally, the simultaneously displaying the VOD data and the EPG data includes:

displaying the VOD data on one side of an interface of a terminal device, and displaying the EPG data on another side of the interface of the terminal device.

Optionally, the simultaneously displaying the VOD data and the EPG data includes:

displaying the VOD data on one window of the interface of the terminal device, and displaying the EPG data on another window of the interface of the terminal device, where the one window overlaps with the another window.

Optionally, after the displaying the VOD data and the EPG data simultaneously, when the VOD data and the EPG data are determined to have been received, it further includes:

receiving a play instruction sent by the user; and playing data indicated by the play instruction, according to the play instruction.

Optionally, the request information includes any one or more of the following: voice information, touch information, and gesture information.

A second aspect of the present disclosure provides a method for obtaining play data, including:

receiving request information sent by a terminal device;

searching VOD data and electronic program guide (EPG) data according to the request information simultaneously, where the EPG data includes live broadcast data and live broadcast playback data; and transmitting the VOD data and the EPG data to the terminal device when the VOD data and the EPG data are determined to be searched, so that the terminal device displays the VOD data and the EPG data.

Optionally, the searching the VOD data and the EPG data according to the request information simultaneously includes:

parsing the request information to obtain a keyword; and searching the VOD data and the EPG data simultaneously, according to the keyword.

Optionally, the request information includes any one or more of the following: voice information, touch information, and gesture information.

A third aspect of the present disclosure provides an apparatus for obtaining play data, including:

a first receiving module, configured to receive request information sent by a user;

a transmitting module, configured to transmit the request information to a server, so that the server searches VOD data and electronic program guide (EPG) data simultaneously according to the request information, where the EPG data includes live broadcast data and live broadcast playback data;

a second receiving module, configured to receive the VOD data and the EPG data sent by the server; and a displaying module, configured to display the VOD data and the EPG data simultaneously, when the VOD data and the EPG data are determined to have been received.

Optionally, the displaying module is specifically configured to:

display the VOD data on one side of an interface of a terminal device, and displaying the EPG data on another side of the interface of the terminal device.

Optionally, the displaying module is specifically configured to:

display the VOD data on one window of an interface of a terminal device, and display the EPG data on another window of the interface of the terminal device, where the one window overlaps with the another window.

Optionally, the device apparatus includes:

a third receiving module, configured to receive a play instruction sent by the user after the displaying module displays the VOD data and the EPG data simultaneously, when the VOD data and the EPG data are determined to have been received; and a playing module, configured to play data indicated by the play instruction, according to the play instruction.

Optionally, the request information includes any one or more of the following: voice information, touch information, and gesture information.

A fourth aspect of the present disclosure provides an apparatus for obtaining play data, including:

a receiving module, configured to receive request information sent by a terminal device;

a searching module, configured to search VOD data and electronic program guide (EPG) data simultaneously according to the request information, where the EPG data includes live broadcast data and live broadcast playback data; and a transmitting module, configured to transmit the VOD data and the EPG data to the terminal device, when the VOD data and the EPG data are determined to have been searched, so that the terminal device displays the VOD data and the EPG data.

Optionally, the searching module includes:

a parsing submodule, configured to parse the request information to obtain a keyword; and a searching submodule, configured to search the VOD data and the EPG data simultaneously according to the keyword.

Optionally, the request information includes any one or more of the following: voice information, touch information, and gesture information.

A fifth aspect of the present disclosure provides a terminal device, including a transmitter, a receiver, a memory, and a processor;

the memory is configured to store computer instructions; the processor is configured to execute the computer instructions stored in the memory to implement the method for obtaining play data according to any implementation of the first aspect.

A sixth aspect of the present disclosure provides a storage medium, including a readable storage medium and computer instructions stored in the readable storage medium; the computer instructions are configured to implement the method for obtaining play data according to any implementation of the first aspect.

A seventh aspect of the present disclosure provides a server, including a transmitter, a receiver, a memory, and a processor;

the memory is configured to store computer instructions; the processor is configured to execute the computer instructions stored in the memory to implement the method for obtaining play data according to any implementation of the second aspect.

An eighth aspect of the present disclosure provides a storage medium, including a readable storage medium and computer instructions stored in the readable storage medium; the computer instructions are configured to implement the method for obtaining play data according to any implementation of the second aspect.

According to methods, apparatuses, and devices for obtaining play data, and a storage medium according to embodiments of the present disclosure, by receiving the request information sent by a user, and transmitting the request information to the server so that the server searches VOD data and EPG data simultaneously according to request information, where the EPG data includes live broadcast data and live broadcast playback data, and by receiving the VOD data and the EPG data sent by the server, the VOD data and the EPG data are simultaneously displayed, when the VOD data and the EPG data are determined to have been received. Therefore, the VOD data and the EPG data can be searched simultaneously, and the searched VOD data and the EPG data are sent to the terminal device for displaying, hence, the terminal device can obtain the VOD data and the EPG data simultaneously, allowing the user to obtain the VOD data and the EPG data simultaneously, so as to facilitate the user to watch the data in time.

BRIEF DESCRIPTION OF DRAWINGS

To describe the technical solutions in embodiments of the present disclosure or in the prior art clearer, the following briefly introduces the accompanying drawings needed for describing the embodiments or the prior art. Apparently, the accompanying drawings in the following description illustrate some embodiments of the present disclosure, and persons of ordinary skill in the art may still derive other drawings from the accompanying drawings without any creative effort.

DESCRIPTION OF EMBODIMENTS

To make the objectives, technical solutions, and advantages of embodiments of the present disclosure clearer, the following clearly and comprehensively describes the technical solutions in embodiments of the present disclosure with reference to the accompanying drawings in embodiments of the present disclosure. Apparently, the described embodiments are merely a part rather than all embodiments of the present disclosure. All other embodiments obtained by persons of ordinary skill in the art based on embodiments of the present disclosure without creative effort shall fall within the protection scope of the present disclosure.

In recent years, artificial intelligence technology has been developed profoundly and has gradually been productionized. In a family scene, artificial intelligence is applied to household electrical devices such as a television and a loudspeaker. A user may obtain VOD data through a VOD technology; for example, the user may find the VOD data through a voice control intelligent terminal device, for example, finding a TV show, a movie and the like that he/she wants to watch. Alternatively, the user may obtain live broadcast data through live broadcast technology. It can be seen that, the user's demands to accurately search data in different scenes may direct to different channels, for example, the user needs to search VOD data, or the user needs to search live broadcast data.

The user's demands for VOD, live broadcast or live broadcast playback may be different depending on different time. However, there are many unique high-quality resources in the live broadcast and live broadcast playback. For example, resources of "CCTV News" and other programs may only exist in the live broadcast and live broadcast playback, and does not exist in the resources of VOD, and this part of resources may be introduced into a result for accurate search demand to supplement existing resources of VOD.

For the problems existing above, the present disclosure provides a method for obtaining play data, and the solutions are described in detail through several specific embodiments in the following.

Figure 1:
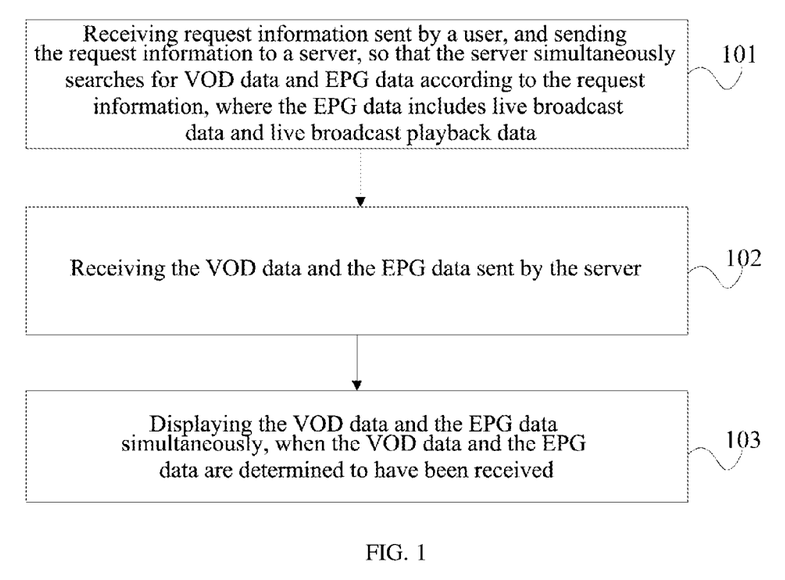
FIG. 1 is a schematic flowchart of a first embodiment of a method for obtaining play data according to the present disclosure.

FIG. 1 is a schematic flowchart of a first embodiment of a method for obtaining play data according to the present disclosure. As shown in FIG. 1, an execution entity of this solution is a terminal device such as a mobile phone, a tablet computer and the like, and the method for obtaining play data specifically includes the following steps:

S101. receiving request information sent by a user, and transmitting the request information to a server, so that the server searches VOD data and electronic program guide (EPG) data simultaneously according to the request information, where the EPG data includes live broadcast data and live broadcast playback data.

In this step, it should be understood that the data herein include audio, or video, or audio and video, and also include images and texts in special scenes, which will not be limited in the present solution.

After the user opens a terminal device, the user inputs the request information to the terminal device. For example, the user transmits voice "I want to search A TV play".

Moreover, the terminal device may perform a preliminary identification to the voice, and only when there is a precise title in what the user said, the terminal device triggers subsequent steps of the present embodiment, and then a hybrid search of the VOD data and the EPG data is performed.

Then, the terminal device transmits the request information to the server. Then, the server parses the received request information to obtain a keyword; and the server may search the VOD data and the EPG data simultaneously according to the keywords, where the EPG data includes live broadcast data and live broadcast playback data.

For example, the server parses the request information to obtain a title, a TV station name, and an action type. For example, after the server parses the voice, it may be obtained that film=X (title); or, after the server parses the voice, it may be obtained that film=X (title), and tv_station=Y (TV station); or, after the server parses the voice, it may be obtained that film=X (title), and action_type=Z (action type); or, after the server parses the voice, it may be obtained that film=X (title), tv_station=Y (TV station), and action_type=Z (action type). Therefore, the server may search the VOD data and the EPG data according to the parsed title, TV station name, action type, and the like.

In this solution, it should be understood that the server and the terminal device may be directly connected, for example, the server and the terminal device may be connected through a link such as Bluetooth, Near Field Communication (NFC) and the like. The server may directly transmit an instruction and a message to the terminal device to complete control of the terminal device.

Optionally, the server and the terminal device may also access to a network separately, for example, the server and the terminal device both access to a same Wireless Fidelity (WIFI) network, and the server transmits an instruction and a message to the terminal device through the wireless network so as to achieve control of the terminal device, which will not be limited in this solution.

S102. receiving the VOD data and the EPG data sent by the server.

In this step, when the server searches the VOD data and the EPG data, the server may use an existing VOD search logic to search the VOD data; and for the EPG data, when there is only a title as the keyword, the server may search data corresponding to the title in TV stations, and when there are a title and a TV station name as the keywords, the server may search data corresponding to the title in the TV station corresponding to the TV station name.

Then, the server transmits the searched VOD data and EPG data to the terminal device, when the VOD data and the EPG data have been searched out simultaneously.

S103. displaying the VOD data and the EPG data simultaneously, when the VOD data and the EPG data are determined to have been received.

In this step, the terminal device, when receiving both the VOD data and the EPG data, may simultaneously displays the VOD data and the EPG data. The terminal device, when receiving the VOD data alone, displays the VOD data. The terminal device, when receiving the EPG data alone, displays the EPG data.

According to methods for obtaining play data according to embodiments of the present disclosure, by receiving the request information sent by a user, and transmitting the request information to the server so that the server searches VOD data and EPG data simultaneously according to request information, where the EPG data includes live broadcast data and live broadcast playback data, and by receiving the VOD data and the EPG data sent by the server, the VOD data and the EPG data are simultaneously displayed, when the VOD data and the EPG data are determined to have been received. Therefore, the VOD data and the EPG data can be searched simultaneously, and the searched VOD data and the EPG data are sent to the terminal device for displaying, hence, the terminal device can obtain the VOD data and the EPG data simultaneously, allowing the user to obtain the VOD data and the EPG data simultaneously, so as to facilitate the user to watch the data in time.

Figure 2:
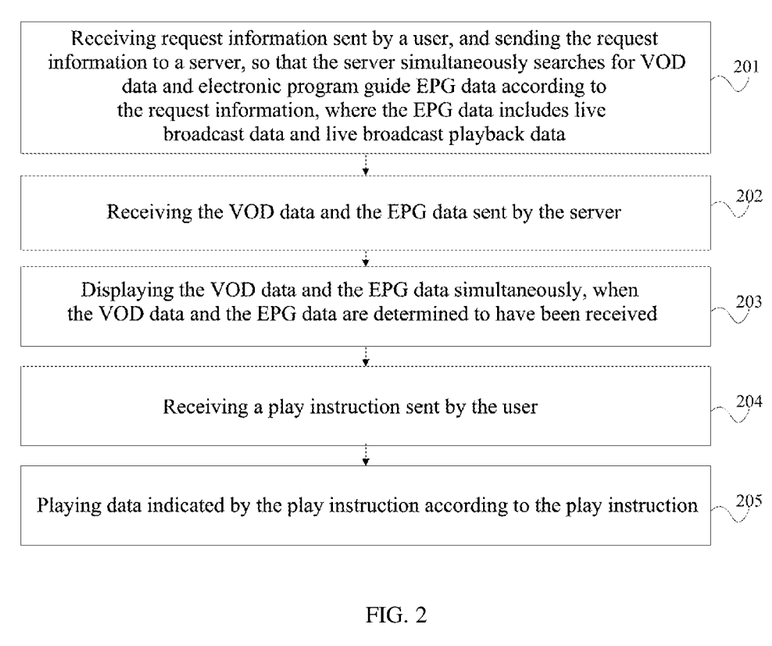
FIG. 2 is a schematic flowchart of a second embodiment of a method for obtaining play data according to the present disclosure.

FIG. 2 is a schematic flowchart of a second embodiment of a method for obtaining play data according to the present disclosure. As shown in FIG. 2, based on the foregoing first embodiment, in a further implementation manner of the method for obtaining play data, it specifically includes the following steps:

S201: receiving request information sent by a user, and transmitting the request information to a server, so that the server searches VOD data and EPG data simultaneously according to the request information, where the EPG data includes live broadcast data and live broadcast playback data.

Where, the request information includes any one or more of the following: voice information, touch information, and gesture information.

In this embodiment, the server may directly connect to the terminal device, for example, via a Bluetooth wireless connection, or via a wired connection.

This step may be referred to step S101 in FIG. 1. The user may use one or more of: inputting voice to the terminal device, inputting gesture information to the terminal device, or touching a screen or a keyboard of the terminal device, to input the request information to the terminal device.

In this step, when the server searches VOD data and EPG data, for VOD data, when the server can find VOD data corresponding to the keyword in an VOD database, the server transmits the VOD data searched to the terminal device; when the server can not find VOD data corresponding to the keyword in the VOD database, the server may transmit VOD data related to the VOD data corresponding to the keyword to the terminal device, that is, the server pushes similar episodes or popular episodes to the terminal device, and the server may sort VOD data according to time, heat, and score of the VOD data.

For live broadcast data, when searching live broadcast data corresponding to the keyword, the server identifies a live broadcast entrance from N minutes prior to broadcast time of the live broadcast data to broadcast end time. And when there are a plurality of TV stations broadcasting the live broadcast data simultaneously, broadcast entrances of the plurality of TV stations broadcasting the live broadcast data are identified simultaneously. For other times, the server does not identify the live broadcast entrance. Moreover, the server may sort the live broadcast data according to program information of the live broadcast data, for example, according to time from earlier to later.

For live broadcast playback data, the server may search live broadcast playback data from X days prior to the moment of receiving the request information, and then after obtaining the live broadcast playback data corresponding to the keyword, the server determines a playback entrance, thus the terminal device may display the playback entrance. When the server is unable to search out the live broadcast data, the server does not display the playback entrance. When the server searches out a plurality of same live broadcast playback data, the server may only keep one of the plurality of the live broadcast playback data, for example, the server only keeps the live broadcast playback data closest to the current time. The server may, according to program information in the live broadcast playback data, sort a plurality of playback entrances according to time from earlier to later.

When there are too many TV stations corresponding to the live broadcast data and there are too many replays of the live broadcast data, the server may only return a result of a main broadcast time of a main TV station.

S202. receiving the VOD data and the EPG data sent by the server.

In this step, this step may be referred to step S101 of FIG. 1, and will not be described again.

S203. displaying the VOD data and the EPG data simultaneously, when the VOD data and the EPG data are determined to have been received.

Specifically, step S203 includes the following two implementation manners:

the first implementation manner of step S203 is: displaying the VOD data on one side of an interface of a terminal device, and displaying the EPG data on another side of the interface of the terminal device; and the second implementation manner of step S203 is: displaying the VOD data on one window of the interface of the terminal device, and displaying the EPG data on another window of the interface of the terminal device, where the one window overlaps with the another window.

Figure 3:
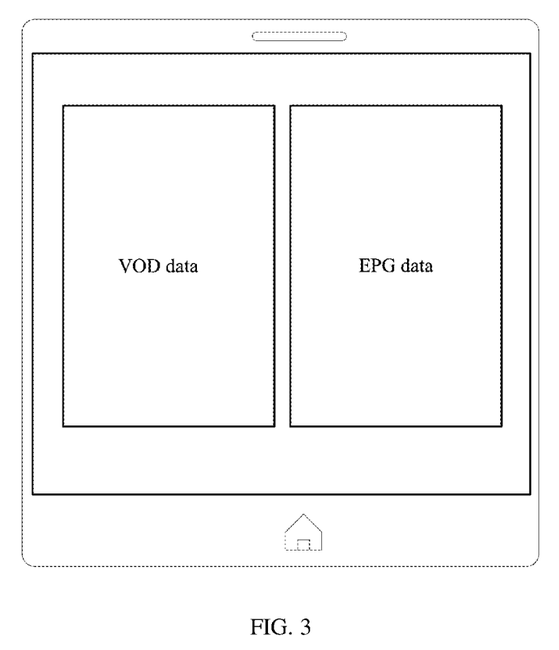
FIG. 3 is a first schematic displaying diagram of the second embodiment of the method for obtaining play data according to the present disclosure.

In this step, when the VOD data and the EPG data are simultaneously searched by the server, the terminal device may simultaneously receive the VOD data and the EPG data; the terminal device may display the VOD data and the EPG data on both sides of the interface of the terminal device, respectively. FIG. 3 is a first schematic displaying diagram of the second embodiment of a method for obtaining play data according to the present disclosure. As shown in FIG. 3, the VOD data is displayed on one side of the interface of the terminal device, and the EPG data is displayed on another side of the interface of the terminal device.

Figure 4:
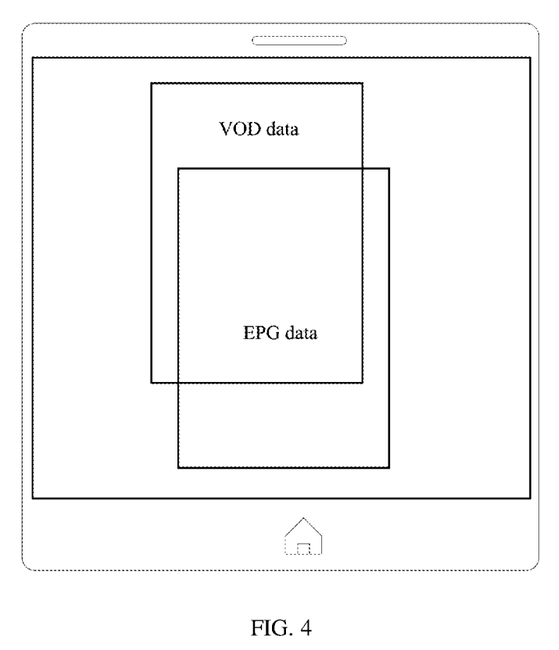
FIG. 4 is a second schematic displaying diagram of the second embodiment of the method for obtaining play data according to the present disclosure.

Alternatively, when the VOD data and the EPG data are simultaneously searched by the server, the terminal device may simultaneously receive the VOD data and the EPG data; the terminal device may provide two windows, display the VOD data on one window, and display the EPG on the other window, and the two windows are overlapped. FIG. 4 is a second schematic displaying diagram of the second embodiment of the method for obtaining play data according to the present disclosure, as shown in FIG. 4.

S204. receiving a play instruction sent by the user.

In this step, when the terminal device simultaneously displays the VOD data and the EPG data, the user may select which data to watch. Then, the user may transmit the play instruction to the terminal device via a manner such as voice interaction, touching terminal, and gesture interaction, and the play instruction indicates one data of the VOD data and the EPG data.

S205. playing data indicated by the play instruction according to the play instruction.

In this step, the terminal device plays the data indicated by the play instruction, for example, the terminal device plays the VOD data or the EPG data.

According to methods for obtaining play data according to embodiments of the present disclosure, by receiving the request information sent by a user, and transmitting the request information to the server so that the server searches VOD data and EPG data simultaneously according to request information, where the EPG data includes live broadcast data and live broadcast playback data, and by receiving the VOD data and the EPG data sent by the server, the VOD data and the EPG data are simultaneously displayed, when the VOD data and the EPG data are determined to have been received. Therefore, the VOD data and the EPG data can be searched simultaneously, and the searched VOD data and the EPG data are sent to the terminal device for displaying, hence, the terminal device can obtain the VOD data and the EPG data simultaneously, allowing the user to obtain the VOD data and the EPG data simultaneously, so as to facilitate the user to watch the data in time, which may take both the convenience of VOD and the timeliness of live broadcast into account, thereby improving the user experience.

Figure 5:
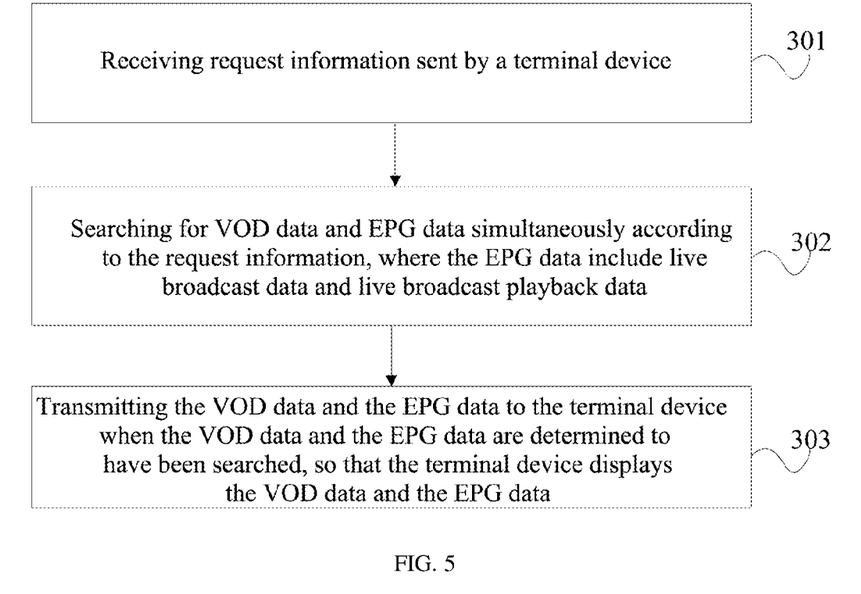
FIG. 5 is a schematic flowchart of a third embodiment of a method for obtaining play data according to the present disclosure.

FIG. 5 is a schematic flowchart of a third embodiment of a method for obtaining play data according to the present disclosure. As shown in FIG. 5, the method for obtaining the play data includes the following steps:

S301. receiving request information sent by a terminal device.

Where, the request information includes any one or more of the following: voice information, touch information, and gesture information.

S302. searching VOD data and EPG data simultaneously according to the request information, where the EPG data includes live broadcast data and live broadcast playback data.

S303. transmitting the VOD data and the EPG data to the terminal device when the VOD data and the EPG data are determined to have been searched, so that the terminal device displays the VOD data and the EPG data.

Where, S302 specifically includes: parsing the request information to obtain a keyword; and searching the VOD data and the EPG data simultaneously according to the keywords.

This embodiment may refer to the methods according to FIG. 1 to FIG. 4, and details are not described herein again.

According to methods for obtaining play data according to embodiments of the present disclosure, by receiving the request information sent by a user, and transmitting the request information to the server so that the server searches VOD data and EPG data simultaneously according to request information, where the EPG data includes live broadcast data and live broadcast playback data, and by receiving the VOD data and the EPG data sent by the server, the VOD data and the EPG data are simultaneously displayed, when the VOD data and the EPG data are determined to have been received. Therefore, the VOD data and the EPG data can be searched simultaneously, and the searched VOD data and the EPG data are sent to the terminal device for displaying, hence, the terminal device can obtain the VOD data and the EPG data simultaneously, allowing the user to obtain the VOD data and the EPG data simultaneously, so as to facilitate the user to watch the data in time, which may take both the convenience of VOD and the timeliness of live broadcast into account, thereby improving the user experience.

Figure 6:
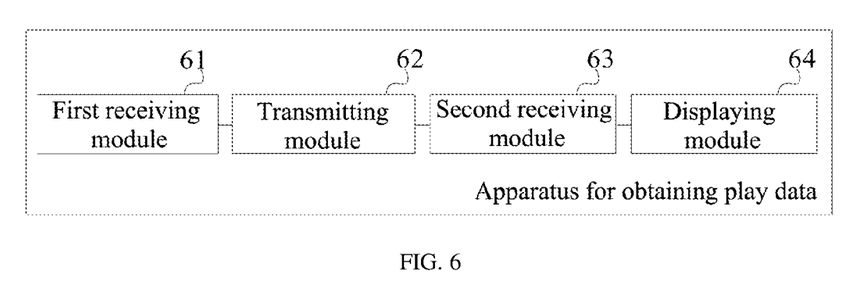
FIG. 6 is a schematic structural diagram of a first embodiment of an apparatus for obtaining play data according to the present disclosure.

FIG. 6 is a schematic structural diagram of a first embodiment of an apparatus for obtaining play data according to the present disclosure. As shown in FIG. 6, the apparatus for obtaining the play data according to this embodiment includes:

a first receiving module 61, configured to receive request information sent by a user;

a transmitting module 62, configured to transmit the request information to a server, so that the server searches VOD data and EPG data simultaneously according to the request information, where the EPG data includes live broadcast data and live broadcast playback data;

a second receiving module 63, configured to receive the VOD data and the EPG data sent by the server; and a displaying module 64, configured to display the VOD data and the EPG data simultaneously when the VOD data and the EPG data are determined to have been received.

The apparatus for obtaining play data according to this embodiment has the same technical solutions with that of a terminal device in apparatuses methods for obtaining play data according to any of the foregoing embodiments, implementation principles and technical effects thereof are similar, and details are not described herein again.

Figure 7:
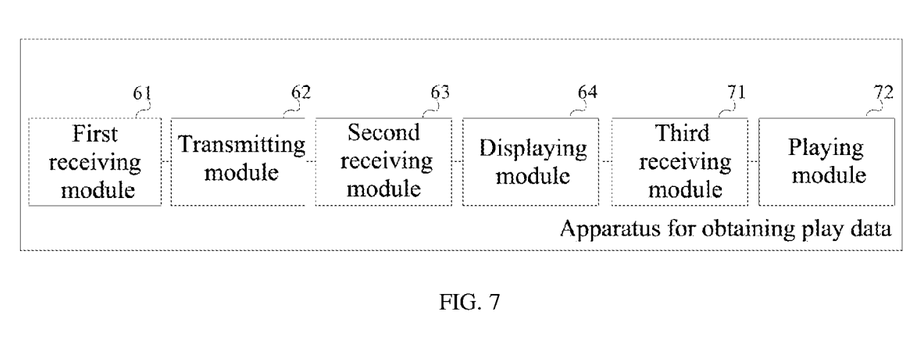
FIG. 7 is a schematic structural diagram of a second embodiment of an apparatus for obtaining play data according to the present disclosure.

FIG. 7 is a schematic structural diagram of a second embodiment of an apparatus for obtaining play data according to the present disclosure. Based on the embodiment shown in FIG. 6, as shown in FIG. 7, in the apparatus for obtaining play data according to the present embodiment, the displaying module 64 is specifically configured to:

display the VOD data on one side of an interface of a terminal device, and display the EPG data on another side of the interface of the terminal device.

Alternatively, the displaying module 64 is specifically configured to:

display the VOD data on one window of the interface of the terminal device, and display the EPG data on another window of the interface of the terminal device, where the one window overlaps with the another window.

The apparatus according to this embodiment, further includes:

a third receiving module 71, configured to receive a play instruction sent by the user after the displaying module 64 displays the VOD data and the EPG data simultaneously when the displaying module determines that the VOD data and the EPG data are received; and a playing module 72, configured to play data indicated by the play instruction according to the play instruction.

Where, the request information includes any one or more of the following: voice information, touch information, and gesture information.

The apparatus for obtaining play data according to this embodiment has the same technical solutions with that of terminal devices in methods for obtaining play data according to any of the foregoing embodiments, implementation principles and technical effects thereof are similar, and details are not described herein again.

Figure 8:
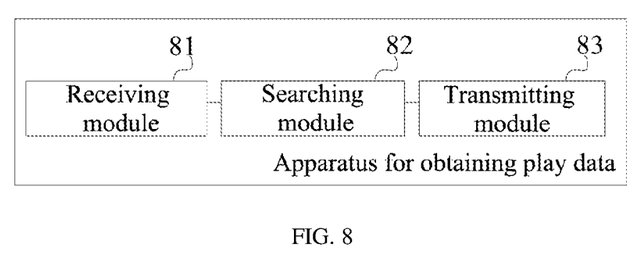
FIG. 8 is a schematic structural diagram of a third embodiment of an apparatus for obtaining play data according to the present disclosure.

FIG. 8 is a schematic structural diagram of a third embodiment of an apparatus for obtaining play data according to the present disclosure. As shown in FIG. 8, the apparatus for obtaining play data according to this embodiment includes:

a receiving module 81, configured to receive request information sent by a terminal device;

a searching module 82, configured to search VOD data and EPG data simultaneously according to the request information, where the EPG data includes live broadcast data and live broadcast playback data; and a transmitting module 83, configured to transmit the VOD data and the EPG data to the terminal device when the VOD data and the EPG data are determined to be searched, so that the terminal device displays the VOD data and the EPG data.

The searching module 82 includes:

a parsing submodule, configured to parse the request information to obtain a keyword; and a searching submodule, configured to search the VOD data and the EPG data simultaneously according to the keyword.

The request information includes any one or more of the following: voice information, touch information, and gesture information.

The apparatus for obtaining the play data according to this embodiment has the same technical solutions with that of the server in the methods for obtaining play data according to any of the foregoing embodiments, implementation principles and technical effects thereof are similar, and details are not described herein again.

Figure 9:
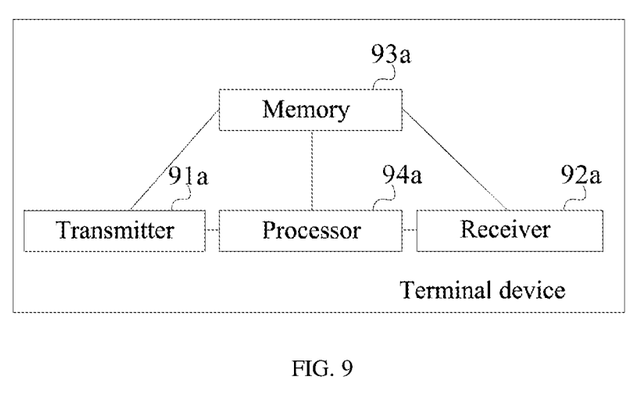
FIG. 9 is a schematic structural diagram of a first embodiment of a terminal device according to the present disclosure.

FIG. 9 is a schematic structural diagram of a first embodiment of a terminal device according to the present disclosure. As shown in FIG. 9, the terminal device includes a transmitter 91a, a receiver 92a, a memory 93a, and a processor 94a.

The memory 93a is configured to store computer instructions; the processor 94a is configured to execute the computer instructions stored in the memory to implement technical solutions of the methods for obtaining play data in any implementation manner according to the foregoing embodiments in FIG. 1 to FIG. 4.

The present disclosure further provides a storage medium, including a readable storage medium and computer instructions stored in the readable storage medium; the computer instructions are configured to implement technical solutions of the methods for obtaining play data in any implementation manner according to the foregoing embodiments of FIG. 1 to FIG. 4.

Figure 10:
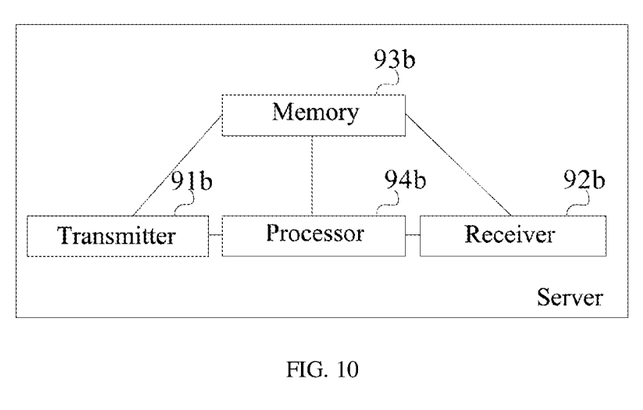
FIG. 10 is a schematic structural diagram of a first embodiment of a server according to the present disclosure.

FIG. 10 is a schematic structural diagram of a first embodiment of a server according to the present disclosure. As shown in FIG. 10, the server includes a transmitter 91b, a receiver 92b, a memory 93b, and a processor 94b.

The memory 93b is configured to store computer instructions; the processor 94b is configured to execute the computer instructions stored in the memory to implement technical solutions of the methods for obtaining play data in any implementation manner according to the foregoing embodiments in FIG. 5.

The present disclosure further provides a storage medium, including a readable storage medium and computer instructions stored in the readable storage medium, the computer instructions are configured to implement technical solutions of the methods for obtaining play data in any implementation manner according to the foregoing embodiment of FIG. 5.

In a specific implementation of the foregoing control devices, it should be understood that the processor may be a central processing unit (CPU), or may be other general purpose processor, a digital signal processor (DSP), an application specific integrated circuit (ASIC), and the like. The general purpose processor may be a microprocessor or the processor may be any conventional processor. The steps of the methods disclosed in embodiments of the present disclosure may be directly expressed as being implemented by a hardware processor, or being performed by a combination of hardware and software modules in the processor.

Persons of ordinary skill in the art may understand that all or a part of the steps of the methods according to above embodiments may be implemented by a program instruction relevant hardware. The foregoing program may be stored in a computer readable storage medium. When the program is run, the steps including the methods according to the embodiments are performed. The foregoing storage medium includes a read-only memory (ROM), a random access memory (RAM), a flash memory, a hard disk, a solid state hard disk, a magnetic tape, a floppy disk, an optical disc and any combination thereof.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent substitutions to some or all technical features thereof, without departing from the scope of the technical solutions of embodiments of the present disclosure.

What is claimed is:

1. A method for obtaining play data, comprising:
receiving request information sent by a user, and transmitting the request information to a server, so that the server searches video on demand (VOD) data and electronic program guide (EPG) data simultaneously according to the request information, wherein the EPG data comprises live broadcast data and live broadcast playback data;
receiving the VOD data and the EPG data sent by the server; and
displaying the VOD data and the EPG data simultaneously, when the VOD data and the EPG data are determined to have been received;
wherein the method further comprises:
displaying a live broadcast entrance, wherein the live broadcast entrance is identified by the sever from N minutes prior to broadcast time of the live broadcast data to broadcast end time;
wherein only when there is a precise title in the request information, a hybrid search of the VOD data and the EPG data is triggered.

2. The method according to claim 1, wherein the displaying the VOD data and the EPG data simultaneously, comprises:
displaying the VOD data on one side of an interface of a terminal device, and displaying the EPG data on another side of the interface of the terminal device.

3. The method according to claim 1, wherein the displaying the VOD data and the EPG data simultaneously comprises:
displaying the VOD data on one window of an interface of a terminal device, and displaying the EPG data on another window of the interface of the terminal device, wherein the window overlaps with the another window.

4. The method according to claim 1, after the displaying the VOD data and the EPG data simultaneously, when the VOD data and the EPG data are determined to have been received, further comprising:
receiving a play instruction sent by the user; and
playing data indicated by the play instruction, according to the play instruction.

5. The method according to claim 1, wherein the request information comprises any one or more of the following:
voice information, touch information, and gesture information.

6. A method for obtaining play data, comprising:
receiving request information sent by a terminal device;
searching video on demand (VOD) data and electronic program guide (EPG) data simultaneously according to the request information, wherein the EPG data comprises live broadcast data and live broadcast playback data; and
transmitting the VOD data and the EPG data to the terminal device when the VOD data and the EPG data are determined to have been searched, so that the terminal device displays the VOD data and the EPG data;
wherein the method further comprises:
identifying a live broadcast entrance from N minutes prior to broadcast time of the live broadcast data to broadcast end time;
wherein only when there is a precise title in the request information, a hybrid search of the VOD data and the EPG data is triggered.

7. The method according to claim 6, wherein the searching the VOD data and the EPG data simultaneously according to the request information comprises:
parsing the request information to obtain a keyword; and
searching the VOD data and the EPG data simultaneously according to the keyword.

8. The method according to claim 6, wherein the request information comprises any one or more of the following:
voice information, touch information, and gesture information.

9. A terminal device, comprising: a transmitter, a receiver, a memory, and a processor;
the memory is configured to store computer instructions;
the receiver is configured to receive request information sent by a user;
the transmitter is configured to transmit the request information to a server, so that the server searches video on demand (VOD) data and electronic program guide (EPG) data simultaneously according to the request information, wherein the EPG data comprises live broadcast data and live broadcast playback data;
the receiver is further configured to receive the VOD data and the EPG data sent by the server; and
the processor is configured to execute the computer instructions stored in the memory to display the VOD data and the EPG data simultaneously, when the VOD data and the EPG data are determined to have been received;
the processor is further configured to execute the computer instructions stored in the memory to display a live broadcast entrance, wherein the live broadcast entrance is identified by the sever from N minutes prior to broadcast time of the live broadcast data to broadcast end time;
wherein only when there is a precise title in the request information, a hybrid search of the VOD data and the EPG data is triggered.

10. The terminal device according to claim 9, wherein the processor is configured to execute the computer instructions stored in the memory to display the VOD data on one side of an interface of a terminal device, and displaying the EPG data on another side of the interface of the terminal device.

11. The terminal device according to claim 9, wherein the processor is configured to execute the computer instructions stored in the memory to:
display the VOD data on one window of an interface of a terminal device, and display the EPG data on another window of the interface of the terminal device, wherein the one window overlaps with another window.

12. The terminal device according to claim 9, the receiver is further configured to receive a play instruction sent by the user after the displaying module displays the VOD data and the EPG data simultaneously when the VOD data and the EPG data are determined to have been received; and
the processor is configured to execute the computer instructions stored in the memory to play data indicated by the play instruction, according to the play instruction.

13. The terminal device according to claim 9, wherein the request information comprises any one or more of the following:
voice information, touch information, and gesture information.

14. A server, comprising a transmitter, a receiver, a memory, and a processor;
the memory is configured to store computer instructions;
the receiver is configured to receive request information sent by a terminal device;
the processor is configured to execute the computer instructions stored in the memory to search video on demand (VOD) data and electronic program guide (EPG) data according to the request information simultaneously, wherein the EPG data comprises live broadcast data and live broadcast playback data; and
the transmitter is configured to transmit the VOD data and the EPG data to the terminal device when the VOD data and the EPG data are determined to be searched, so that the terminal device displays the VOD data and the EPG data;
the processor is further configured to execute the computer instructions stored in the memory to identify a live broadcast entrance from N minutes prior to broadcast time of the live broadcast data to broadcast end time;
wherein only when there is a precise title in the request information, a hybrid search of the VOD data and the EPG data is triggered.

15. The server according to claim 14, wherein the processor is configured to execute the computer instructions stored in the memory to:
parse the request information to obtain a keyword; and
search the VOD data and the EPG data simultaneously according to the keyword.

16. The server according to claim 14, wherein the request information comprises any one or more of the following:
voice information, touch information, and gesture information.

17. The method according to claim 1, wherein the method further comprises:
displaying a playback entrance,
wherein the playback entrance is determined by the server after the live broadcast playback data corresponding to a keyword is obtained, and the live broadcast playback data is live broadcast playback data from X days prior to a moment of receiving the request information searched by the server.

18. The method according to claim 6, wherein the method further comprises:
searching live broadcast playback data from X days prior to a moment of receiving the request information, and then determining a playback entrance after obtaining the live broadcast playback data corresponding to a keyword.

19. The terminal device according to claim 9, wherein the processor is further configured to execute the computer instructions stored in the memory to display a playback entrance,
wherein the playback entrance is determined by the server after the live broadcast playback data corresponding to a keyword is obtained, and the live broadcast playback data is live broadcast playback data from X days prior to a moment of receiving the request information searched by the server.

20. The server according to claim 14, wherein the processor is further configured to execute the computer instructions stored in the memory to search live broadcast playback data from X days prior to a moment of receiving the request information, and then determine a playback entrance after obtaining the live broadcast playback data corresponding to a keyword.

* * * * *